(12) United States Patent
He et al.

(10) Patent No.: US 10,522,073 B2
(45) Date of Patent: Dec. 31, 2019

(54) SENSING CIRCUIT AND VOLTAGE COMPENSATION METHOD

(71) Applicants: BOE Technology Group Co., Ltd., Beijing (CN); HEFEI XINSHENG OPTOELECTRONICS TECHNOLOGY CO., LTD., Anhui (CN)

(72) Inventors: Min He, Beijing (CN); Chun Cao, Beijing (CN); Leilei Cheng, Beijing (CN); Yongchao Huang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/986,083

(22) Filed: May 22, 2018

(65) Prior Publication Data

US 2019/0164472 A1 May 30, 2019

(30) Foreign Application Priority Data

Nov. 27, 2017 (CN) .......................... 2017 1 1207919

(51) Int. Cl.
*G09G 3/3208* (2016.01)
*H02J 7/00* (2006.01)
*H02J 7/34* (2006.01)

(52) U.S. Cl.
CPC .......... *G09G 3/3208* (2013.01); *H02J 7/0052* (2013.01); *G09G 2310/061* (2013.01);
(Continued)

(58) Field of Classification Search
CPC ................... G06F 3/044; G06F 3/0416; G06F 2203/04112; G09G 3/3611; G09G 3/3208;
(Continued)

(56) References Cited

U.S. PATENT DOCUMENTS 7,598,752 B2    10/2009  Li
8,836,350 B2    9/2014   Peter
(Continued)

FOREIGN PATENT DOCUMENTS

CN     1832349 A     9/2006
CN   101943716 A     1/2011
(Continued)

OTHER PUBLICATIONS

Office Action, including Search Report, for Chinese Patent Application No. 201711207919.8, dated Sep. 2, 2019, 17 pages.

*Primary Examiner* — Abhishek Sarma
(74) *Attorney, Agent, or Firm* — Westman, Champlin & Koehler, P.A.

(57) ABSTRACT

The present disclosure provides a sensing circuit and a voltage compensation method. With the sensing circuit according to the present disclosure, a capacitance value of a capacitor to be measured on an internal sensing line of a display panel is determined, a compensation voltage for the internal sensing line is determined according to the capacitance value of the capacitor to be measured, and then voltage compensation is performed on the internal sensing line according to the compensation voltage corresponding to the capacitor to be measured.

8 Claims, 4 Drawing Sheets

(52) U.S. Cl.
CPC .............. *G09G 2320/0204* (2013.01); *G09G 2320/0693* (2013.01); *H02J 7/345* (2013.01)

(58) Field of Classification Search
CPC ..... G09G 2310/061; G09G 2320/0693; G09G 2320/0204; H02J 7/0052; H02J 7/345
See application file for complete search history.

(56) References Cited

U.S. PATENT DOCUMENTS

| | | | |
|---|---|---|---|
| 9,013,447 | B2 | 4/2015 | Kim |
| 10,032,409 | B1 | 7/2018 | Wu |
| 10,288,467 | B2 | 5/2019 | Shibata et al. |
| 2007/0247172 | A1 | 10/2007 | Li |
| 2010/0181180 | A1 | 7/2010 | Peter |
| 2013/0113756 | A1 | 5/2013 | Kim |
| 2014/0085285 | A1* | 3/2014 | Kim ................... G09G 3/3266 345/211 |
| 2016/0202104 | A1 | 7/2016 | Shibata et al. |
| 2016/0313862 | A1* | 10/2016 | Mamba ................... G06F 3/044 |
| 2018/0301084 | A1 | 10/2018 | Wu |
| 2018/0330666 | A1 | 11/2018 | Song |
| 2019/0064240 | A1 | 2/2019 | Feng et al. |
| 2019/0066591 | A1 | 2/2019 | Xu et al. |

FOREIGN PATENT DOCUMENTS

| | | |
|---|---|---|
| CN | 102282766 A | 12/2011 |
| CN | 103109196 A | 5/2013 |
| CN | 106097969 A | 11/2016 |
| CN | 106461713 A | 2/2017 |
| CN | 106782286 A | 5/2017 |
| CN | 106782333 A | 5/2017 |
| CN | 106816137 A | 6/2017 |
| CN | 106935203 A | 7/2017 |
| CN | 107086023 A | 8/2017 |
| CN | 107367639 A | 11/2017 |
| CN | 107393469 A | 11/2017 |

* cited by examiner

SENSING CIRCUIT AND VOLTAGE COMPENSATION METHOD

CROSS-REFERENCE TO RELATED APPLICATION(S)

The present application claims priority to the Chinese Patent Application No. 201711207919.8, filed on Nov. 27, 2017, entitled "SENSING CIRCUIT AND VOLTAGE COMPENSATION METHOD", which is incorporated herein by reference in its entirety.

TECHNICAL FIELD

The present disclosure relates to the field of display technology, and more particularly, to a sensing circuit and a voltage compensation method.

BACKGROUND

In related compensation algorithms, differences among capacitors on various internal sensing lines in a display panel are ignored and the capacitors are considered to have the same standardized capacitance value by default. However, the capacitors on various internal sensing lines actually have different capacitance values due to factors such as process deviations etc. If the internal sensing lines are compensated using the same compensation voltage, it may cause deviations in compensation results, thereby resulting in uneven display of a display screen.

SUMMARY

The present disclosure provides a sensing circuit and a voltage compensation method.

In an aspect, there is provided a sensing circuit for sensing a capacitor to be measured on an internal sensing line of a display panel, the sensing circuit comprising a reset circuit, a charging circuit, an adjustment circuit, a voltage sensing circuit, and a calculation circuit, wherein the reset circuit is connected to the capacitor to be measured and is configured to reset a voltage on the capacitor to be measured to a reference voltage;

wherein the charging circuit is connected to a reference capacitor in the adjustment circuit and is configured to charge the reference capacitor to a first voltage;

wherein the adjustment circuit comprises the reference capacitor connected to the charging circuit and is configured to be connected to the capacitor to be measured in series after the reference capacitor is charged to the first voltage, so as to adjust the voltage on the capacitor to be measured to a second voltage;

wherein the voltage sensing circuit is connected to the capacitor to be measured and is configured to sense a voltage value of the second voltage; and wherein the calculation circuit is connected to the voltage sensing circuit and is configured to calculate a capacitance value of the capacitor to be measured according to a capacitance value of the reference capacitor, the reference voltage, the first voltage, and the second voltage.

Further, the reset circuit comprises a reset switch connected to a low voltage input terminal, wherein the reset switch is connected to the capacitor to be measured and is configured to be turned on when the capacitor to be measured is discharged, so as to reset the voltage on the capacitor to be measured through the low voltage input terminal; the charging circuit comprises a charging switch connected to a high voltage input terminal, wherein the charging switch is connected to the reference capacitor and is configured to be turned on when the reference capacitor is charged, so as to reset the voltage on the reference capacitor through the high voltage input terminal; the adjustment circuit comprises a sharing switch connected to the reference capacitor, wherein the sharing switch is connected to the capacitor to be measured and is configured to be turned on when the voltage on the capacitor to be measured is adjusted, so as to share charges on the reference capacitor with the capacitor to be measured; and the voltage sensing circuit comprises an analog-to-digital converter and a sensing switch, wherein the analog-to-digital converter has one terminal connected to the capacitor to be measured through the sensing switch, and the other terminal connected to the calculation circuit, and the analog-to-digital converter is configured to convert the second voltage from an analog voltage signal into a digital voltage signal when the sensing switch is turned on.

Further, the sensing circuit comprises capacitors to be measured on at least two internal sensing lines; and there are sharing switches in one-to-one correspondence with the capacitors to be measured, and the reference capacitor is connected to the capacitors to be measured through corresponding sharing switches, respectively.

In another aspect, there is further provided a voltage compensation method applied to the sensing circuit described above, the voltage compensation method comprising:

determining, by the sensing circuit, a capacitance value of a capacitor to be measured, wherein the capacitor to be measured is a capacitor on an internal sensing line to be measured of a display panel;

determining a compensation voltage for the internal sensing line according to the capacitance value of the capacitor to be measured; and performing voltage compensation on the internal sensing line according to the compensation voltage corresponding to the capacitor to be measured.

Further, the step of determining, by the sensing circuit, a capacitance value of a capacitor to be measured comprises: resetting a voltage on the capacitor to be measured to a reference voltage, and resetting a voltage on a reference capacitor to a first voltage, so as to determine voltage values of the capacitor to be measured and the reference capacitor before they are connected in series; adjusting the voltage on the capacitor to be measured from the reference voltage to a second voltage by connecting the capacitor to be measured and the reference capacitor in series, wherein the second voltage is a voltage of the capacitor to be measured after the capacitor to be measured and the reference capacitor are connected in series; sensing a voltage value of the second voltage; and calculating the capacitance value of the capacitor to be measured according to the voltage values of the capacitor to be measured and the reference capacitor before and after they are connected in series and a capacitance value of the reference capacitor.

Further, the step of calculating the capacitance value of the capacitor to be measured according to the voltage values of the capacitor to be measured and the reference capacitor before and after they are connected in series and a capacitance value of the reference capacitor comprises: calculating the capacitance value of the capacitor to be measured according to the capacitance value of the reference capacitor, a voltage value of the reference voltage, and voltage values of the first voltage and the second voltage.

Further, the sensing circuit comprises at least two capacitors to be measured which are connected in parallel, wherein the step of determining a compensation voltage for the internal sensing line according to the capacitance value of the capacitor to be measured comprises: normalizing capacitance values of respective capacitors to be measured to obtain normalized results; and determining a compensation voltage for an internal sensing line where each of the capacitors to be measured is located according to a normalized result corresponding to the respective capacitor to be measured.

Further, the step of normalizing capacitance values of respective capacitors to be measured comprises: calculating an average value of the capacitance values of respective capacitors to be measured as a standardized capacitance value; and dividing a capacitance value of each of the capacitors to be measured by the standardized capacitance value to obtain a normalized result corresponding to the respective capacitor to be measured.

Further, the step of determining a compensation voltage for an internal sensing line where each of the capacitors to be measured is located according to a normalized result corresponding to the respective capacitor to be measured comprises: calculating the compensation voltage for the internal sensing line where each of the capacitors to be measured is located according to the normalized result, a compensation coefficient, a grayscale value, and a threshold voltage corresponding to the respective capacitor to be measured.

Further, when the sensing circuit comprises capacitors to be measured on at least two internal sensing lines, the step of determining, by the sensing circuit, the capacitance value of the capacitor to be measured comprises: after a capacitance value of one capacitor to be measured is determined, resetting a voltage on a next capacitor to be measured to the reference voltage, and resetting the voltage on the reference capacitor to the first voltage, so as to reset amounts of charges on the capacitor to be measured and the reference capacitor.

DETAILED DESCRIPTION

In order to make the above purposes, features, and advantages of the present disclosure more comprehensible, the present disclosure will be further described in detail with reference to the accompanying drawings and the detailed description.

In the description of the present disclosure, "a plurality of" means two or more, unless otherwise specified. Orientation or positional relationships indicated by the terms "upper", "lower", "left", "right", "inner", and "outer" etc. are orientation or positional relationships shown based on the accompanying drawings and are merely for the convenience of description of the present disclosure and simplification of the description, but do not indicate or imply that the referred mechanisms or elements must have a specific orientation, or must be constructed and operated in a specific orientation, and therefore should not be construed as limiting the present disclosure.

In the description of the present disclosure, it should be illustrated that the terms "install", "connected with", and "connected to" should be understood in a broad sense unless explicitly specified or defined otherwise, and may be, for example, a fixed connection, a removable connection, or an integral connection; or may be a mechanical connection or an electrical connection; or may be a direct connection or an indirect connection through an intermediary. Those of ordinary skill in the art can understand specific meanings of the above terms in the present disclosure according to specific conditions.

The detailed description of the present disclosure will be further described in detail below with reference to the accompanying drawings and the embodiments. The following embodiments are intended to illustrate the present disclosure but are not intended to limit the scope of the present disclosure.

Figure 1:
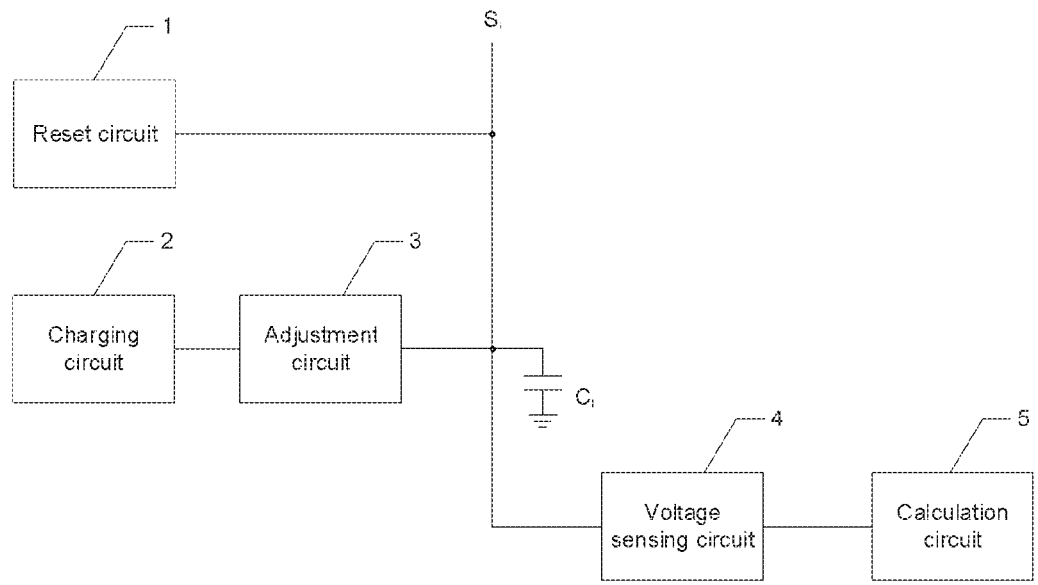
FIG. 1 is a schematic structural diagram of a sensing circuit according to an embodiment of the present disclosure.

As shown in FIG. 1, illustrated is a schematic structural diagram of a sensing circuit according to an embodiment of the present disclosure. The sensing circuit is configured to sense a capacitor to be measured on an internal sensing line of a display panel. The sensing circuit comprises a reset circuit 1, a charging circuit 2, an adjustment circuit 3, a voltage sensing circuit 4, and a calculation circuit 5.

The reset circuit 1 is connected to a capacitor to be measured $C_i$, and is configured to reset a voltage on the capacitor to be measured $C_i$ to a reference voltage. The capacitor to be measured $C_i$ is a capacitor connected to an internal sensing line $S_i$ to be measured of the display panel. The internal sensing line $S_i$ may be a sensing line in an Organic Light-Emitting Diode (OLED) display panel, which is used to compensate for a display voltage of the OLED display panel in real time, so that a more uniform display effect is realized, thereby preventing the electrical performance of the OLED display panel from drifting over time.

Figure 2:
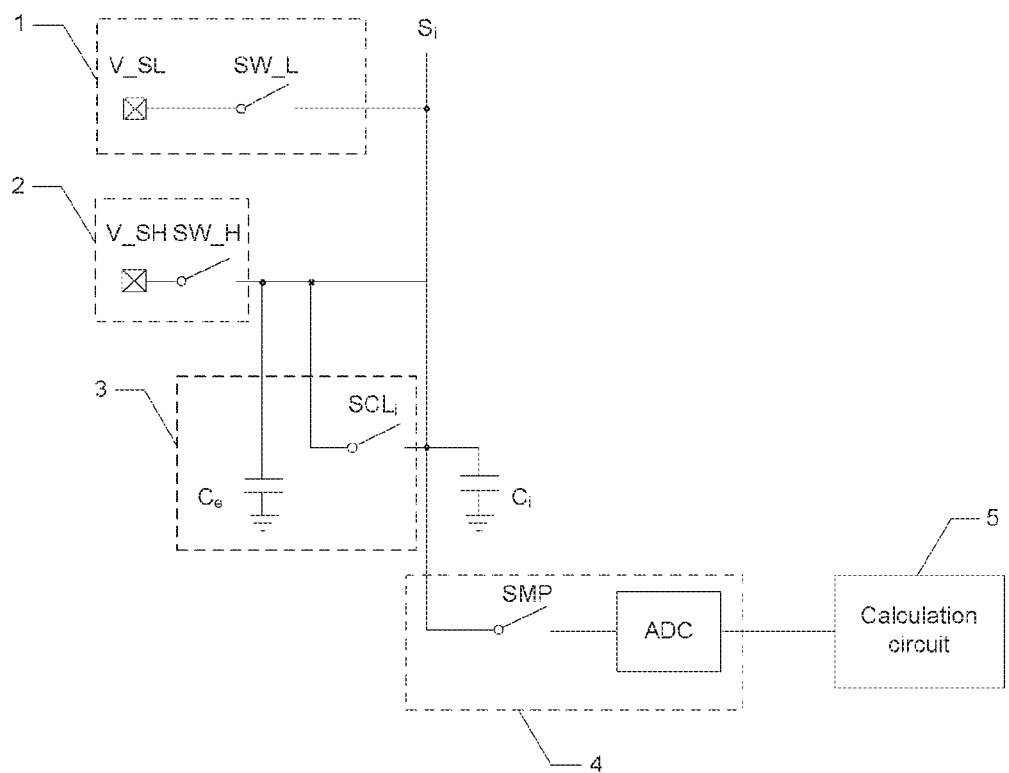
FIG. 2 is a circuit diagram of a sensing circuit according to an embodiment of the present disclosure.

The charging circuit 2 is connected to a reference capacitor $C_e$ in the adjustment circuit 3 and is configured to charge the reference capacitor $C_e$ to a first voltage. Specifically, the reference capacitor $C_e$ is a capacitor having a determined capacitance value. When the reference capacitor $C_e$ (as shown in FIG. 2) is charged by the charging circuit 2 to the first voltage, as the first voltage has a determined voltage value, after the reference capacitor $C_e$ is charged by the charging circuit 2, an amount of charges on the reference capacitor $C_e$ is a determined value, which may be used as a reference for calculating a capacitance value of the capacitance to be measured $C_i$.

The adjustment circuit 3 comprises the reference capacitor $C_e$ connected to the charging circuit 2 and is configured to be connected to the capacitor to be measured $C_i$ in series after the reference capacitor $C_e$ is charged to the first voltage and adjust the voltage on the capacitor to be measured $C_i$ to a second voltage. Specifically, when the reference capacitor $C_e$ and the capacitor to be measured $C_i$ are connected in series, the charges on the reference capacitor $C_e$ may be shared with the capacitor to be measured $C_i$. After charge sharing between the reference capacitor $C_e$ and the capacitor to be measured $C_i$ is completed, the voltage on the capacitor to be measured $C_i$ may also change to the second voltage therewith. According to the law of charge conservation, the reset circuit 1 and the charging circuit 2 are turned off after the voltages on the capacitor to be measured $C_i$ and the reference capacitor $C_e$ are reset, and a sum of amounts of charges on the capacitor to be measured $C_i$ and the reference capacitor $C_e$ remain unchanged before and after they are connected in series.

The voltage sensing circuit 4 is connected to the capacitor to be measured $C_i$ and is configured to sense a voltage value of the second voltage. Specifically, after the charge sharing between the capacitor to be measured $C_i$ and the reference capacitor $C_e$ is completed, the voltage value of the second voltage may be sensed by the voltage sensing circuit 4.

The calculation circuit 5 is connected to the voltage sensing circuit 4 and is configured to calculate the capacitance value of the capacitance to be measured $C_i$ according to a capacitance value of the reference capacitor $C_e$, the reference voltage, the first voltage, and the second voltage.

As shown in FIG. 2, illustrated is a circuit diagram of a sensing circuit according to an embodiment of the present disclosure. The circuit structure according to the embodiment of the present disclosure will be described in detail in combination with FIG. 2.

Specifically, the reset circuit 1 comprises a reset switch SW_L connected to a low voltage input terminal V_SL. The reset switch SW_L is connected to the capacitor to be measured $C_i$ and is configured to be turned on when the capacitor to be measured $C_i$ is discharged, so as to reset the voltage on the capacitor to be measured $C_i$ through the low voltage input terminal V_SL. For example, the low voltage input terminal V_SL may be a ground terminal, so that all the charges on the capacitor to be measured $C_i$ may be released. Thereby, the voltage on the capacitor to be measured $C_i$ is 0 volts and the amount of charges on the capacitor to be measured $C_i$ is 0 coulombs.

The charging circuit 2 comprises a charging switch SW_H connected to a high voltage input terminal V_SH. The charging switch SW_H is connected to the reference capacitor $C_e$ in the adjustment circuit 3, and is configured to be turned on when the reference capacitor $C_e$ is charged, so as to reset the voltage on the reference capacitor $C_e$ through the high voltage input terminal V_SH. Thereby, the high voltage input terminal V_SH can accurately reset the amount of charges on the reference capacitor $C_e$ to a preset amount of charges.

The adjustment circuit 3 further comprises a sharing switch $SCL_i$ connected to the reference capacitor $C_e$. The sharing switch $SCL_i$ is connected to the capacitor to be measured $C_i$, and is configured to be turned on when the voltage on the capacitor to be measured $C_i$ is adjusted, so as to share the charges on the reference capacitor $C_e$ with the capacitor to be measured $C_i$.

The voltage sensing circuit 4 comprises an Analog-to-Digital Converter (ADC) and a sensing switch SMP. The analog-to-digital converter has one terminal connected to the capacitor to be measured $C_i$ through the sensing switch SMP, and the other terminal connected to the calculation circuit 5. The analog-to-digital converter is configured to convert the second voltage from an analog voltage signal into a digital voltage signal when the sensing switch SMP is turned on. Thereby, the voltage value of the second voltage which can be used for the calculation is obtained.

It should be illustrated that in the embodiment of the present disclosure, the reset switch SW_L of the reset circuit 1, the charging switch SW_H of the charging circuit 2, the sharing switch $SCL_i$ of the adjustment circuit 3, and the sensing switch SMP of the voltage sensing circuit 4 are all switching devices. Each of the switching devices may be a semiconductor device having switching characteristics, for example, a switching transistor. For example, if a switching transistor is used as a switching device in the sensing circuit, the switching transistor may be a P-type switching transistor or an N-type switching transistor. If an N-type switching transistor is used, it is turned on when a gate thereof is at a high level and is turned off when the gate is at a low level. If a P-type switching transistor is used, it is turned on when a gate thereof is at a low level and is turned off when the gate is at a high level.

In conclusion, in the sensing circuit according to the embodiment of the present disclosure, the reset circuit 1 is connected to the capacitor to be measured $C_i$, and is configured to reset the voltage on the capacitor to be measured $C_i$ to the reference voltage. The charging circuit 2 is connected to the reference capacitor $C_e$, and is configured to charge the reference capacitor $C_e$ to the first voltage. Thereby, a sum of the amounts of charges on the capacitor to be measured $C_i$ and the reference capacitor $C_e$ may be determined. The reference capacitor $C_e$ is connected to the corresponding capacitor to be measured $C_i$ through the sharing switch $SCL_i$, and is configured to be connected to the capacitor to be measured $C_i$ in series when the sharing switch $SCL_i$ is turned on, so as to adjust the voltage on the capacitor to be measured $C_i$ to the second voltage. As the sum of the amounts of charges on the capacitor to be measured $C_i$ and the reference capacitor $C_e$ before and after they are connected in series does not change, the capacitance value of the capacitor to be measured $C_i$ may be calculated according to the sensed voltage value of the second voltage and the sum of the amounts of charges on the capacitor to be measured $C_i$ and the reference capacitor $C_e$. Thereby, the compensation voltage for the internal sensing line of the display panel may be adjusted according to the capacitance value, which effectively improves the accuracy of the voltage compensation on the internal sensing line.

Figure 3:
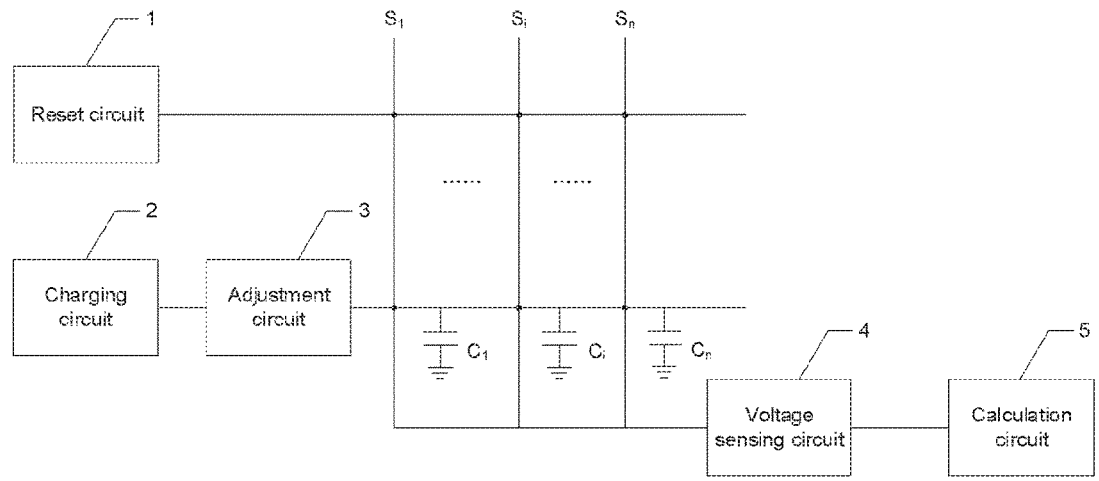
FIG. 3 is a schematic structural diagram of another sensing circuit according to an embodiment of the present disclosure.

As shown in FIG. 3, illustrated is a schematic structural diagram of another sensing circuit according to an embodiment of the present disclosure. It can be known from FIG. 3 that the sensing circuit according to the embodiment of the present disclosure comprises capacitors to be measured on at least two internal sensing lines. In addition, similarly to the embodiment shown in FIG. 1, the sensing circuit further comprises a reset circuit 1, a charging circuit 2, an adjustment circuit 3, a voltage sensing circuit 4, and a calculation circuit 5. The adjustment circuit 3 comprises at least two sharing switches, all of which correspond to capacitors to be measured in one-to-one correspondence. The reference capacitor $C_e$ is connected to the corresponding capacitors to be measured $C_i$ through respective sharing switches respectively.

Specifically, in the related art, the capacitors on various internal sensing lines are usually the same by default. Therefore, when compensation voltages for the internal sensing lines $S_i$ are calculated, the same compensation voltage is usually provided to various internal sensing lines $S_i$. However, due to factors such as process deviations etc., the capacitors on various internal sensing lines are not the same. If the same compensation voltage is provided to various internal sensing lines with different capacitors, it may cause deviations in compensation results, thereby resulting in reduced accuracy of the compensation. The sensing circuit according to the embodiment of the present disclosure senses various capacitors to be measured independently, which can accurately acquire the capacitance values of the capacitors to be measured on various internal sensing lines. Thereby, according to the differences among the capacitance values of various capacitors to be measured, targeted compensation voltages may be provided to respective internal sensing lines, which can effectively improve the accuracy of the compensation.

Figure 4:
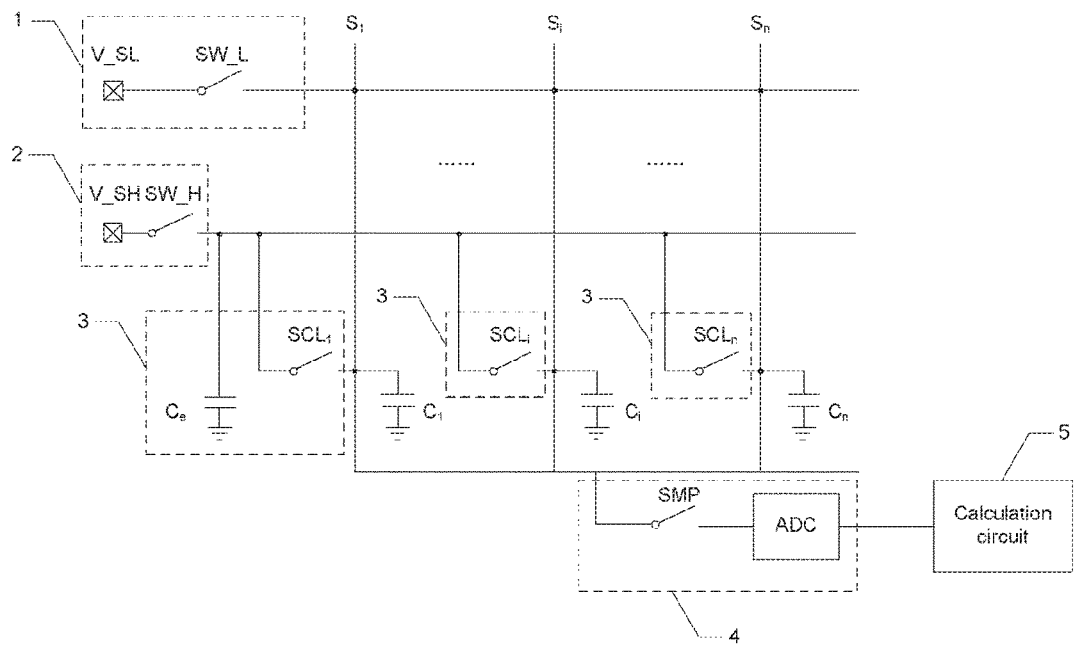
FIG. 4 is a circuit diagram of another sensing circuit according to an embodiment of the present disclosure.

As shown in FIG. 4, illustrated is a circuit diagram of another sensing circuit according to an embodiment of the present disclosure. It can be known from FIG. 4 that various capacitors to be measured are connected in parallel to the reset circuit 1. Therefore, when the reset circuit 1 is turned on, the reset circuit 1 may reset a voltage on each of the capacitors to be measured. For example, if the low voltage input terminal V_SL in the reset circuit 1 is a ground terminal, when the reset circuit 1 is turned on, the voltage on each of the capacitors to be measured may be reset to 0 volts, that is, each of the capacitors to be measured is discharged through the ground terminal, so that an amount of charges on each of the capacitors to be measured is reset to 0 coulombs to determine an amount of charges of each of the capacitors to be measured before the capacitor to be measured and the reference capacitor $C_e$ are connected in series, so that the calculated result of the capacitance value of each of the capacitors to be measured is more accurate.

Specifically, each sharing switch in the adjustment circuit 3 has one terminal connected to the reference capacitor $C_e$, and the other terminal connected to a corresponding capacitor to be measured, so as to control turn-on and turn-off of a connection between each of the capacitors to be measured and the reference capacitor $C_e$, so that the reference capacitor $C_e$ is connected in series to one of the capacitors to be measured each time, and the voltage sensing circuit 4 may sense a voltage value of the capacitor to be measured $C_i$ after the reference capacitor $C_e$ and the capacitor to be measured $C_i$ are connected in series. Thereby, the capacitance value of the capacitor to be measured $C_i$ can be accurately calculated by the calculation circuit 5.

In conclusion, the sensing circuit according to the embodiment of the present disclosure comprises capacitors to be measured on at least two internal sensing lines. Various sharing switches correspond to the capacitors to be measured in one-to-one correspondence, and the reference capacitor $C_e$ is connected to the corresponding capacitors to be measured $C_i$ through respective sharing switches respectively. The voltage sensing circuit 4 in the sensing circuit may sense various capacitors to be measured one by one, so that capacitance values of various capacitors to be measured may be sensed respectively, and targeted compensation voltages for respective internal sensing lines may be determined according to the capacitance values of various capacitors to be measured, which effectively improves the accuracy of the voltage compensation on the internal sensing lines.

Figure 5:
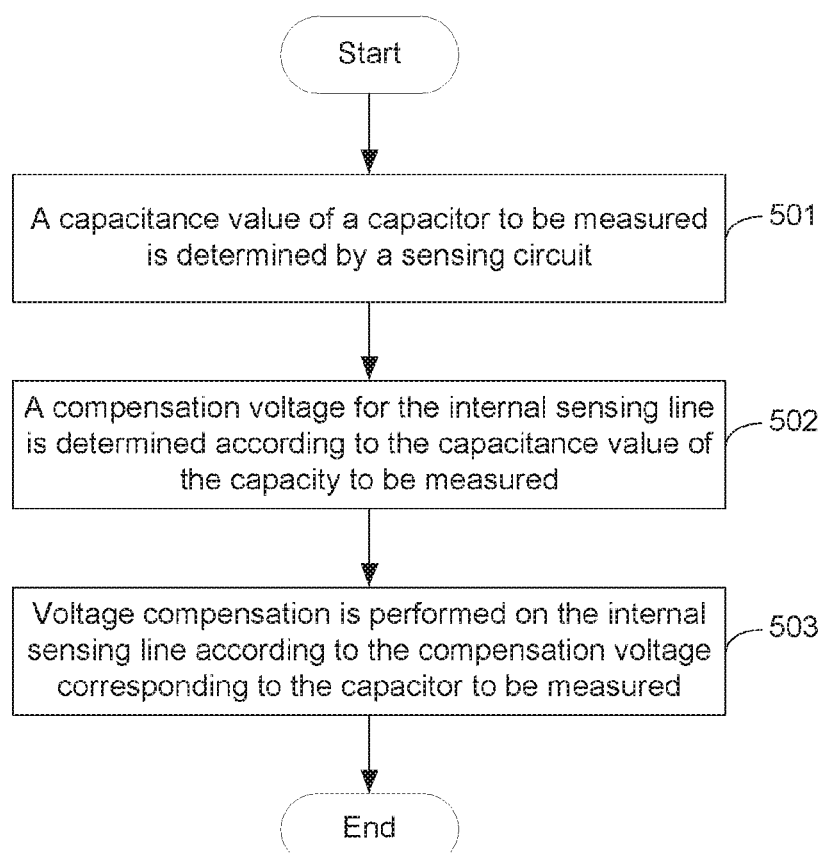
FIG. 5 is a flowchart of a voltage compensation method according to an embodiment of the present disclosure.

The embodiments of the present disclosure further provide a voltage compensation method corresponding to any of the sensing circuits described above. As shown in FIG. 5, illustrated is a flowchart of a voltage compensation method according to an embodiment of the present disclosure. The voltage compensation method comprises the following steps.

In step 501, a capacitance value of a capacitor to be measured is determined by a sensing circuit.

Specifically, the capacitance value of the capacitor to be measured $C_i$ may be determined according to the following sub-steps.

In sub-step A, a voltage on the capacitor to be measured $C_i$ is reset to a reference voltage, and a voltage on a reference capacitor $C_e$ is reset to a first voltage.

After it is determined to sense an internal sensing line $S_i$ in a display panel, a voltage of a capacitor to be measured $C_i$ on the internal sensing line $S_i$ may be reset to the reference voltage, and the voltage on the reference capacitor $C_e$ may be reset to the first voltage, so as to determine voltage values of the capacitor to be measured $C_i$ and the reference capacitor $C_e$ before they are connected in series.

In sub-step B, the voltage on the capacitor to be measured $C_i$ is adjusted from the reference voltage to a second voltage by connecting the capacitor to be measured $C_i$ and the reference capacitor $C_e$ in series.

After the voltages of the capacitor to be measured $C_i$ and the reference capacitor $C_e$ are reset, the voltage on the capacitor to be measured $C_i$ may be adjusted from the reference voltage to the second voltage by connecting the capacitor to be measured $C_i$ and the reference capacitor $C_e$ in series. The second voltage is a voltage of the capacitor to be measured $C_i$ after the capacitor to be measured $C_i$ and the reference capacitor $C_e$ are connected in series. That is, after the reset circuit 1 and the charging circuit 2 are turned off, charges on the reference capacitor $C_e$ flow only to the capacitor to be measured $C_i$, and thereby the charge sharing between the reference capacitor $C_e$ and the capacitor to be measured $C_i$ is realized. As the capacitor to be measured $C_i$ receives the charges from the reference capacitor $C_e$, the voltage on the capacitor to be measured $C_i$ will change to the second voltage therewith.

In sub-step C, a voltage value of the second voltage is sensed.

After the voltage on the capacitor to be measured $C_i$ changes from the reference voltage to the second voltage, the voltage value of the second voltage may be sensed by the voltage sensing circuit 4 connected to the capacitor to be measured $C_i$. Specifically, in the sensing circuit, the voltage on the capacitor to be measured $C_i$ is an analog voltage signal, and the analog voltage signal corresponding to the second voltage may be converted into a digital voltage signal by the analog-to-digital converter in the voltage sensing circuit 4 to obtain the voltage value of the second voltage.

In sub-step D, the capacitance value of the capacitor to be measured $C_i$ is calculated according to the voltage values of the capacitor to be measured $C_i$ and the reference capacitor $C_e$ before and after they are connected in series and a capacitance value of the reference capacitor $C_e$.

After the voltage value of the second voltage is sensed, the capacitance value of the capacitor to be measured $C_i$ may be calculated according to the capacitance value of the reference capacitor $C_e$, a voltage value of the reference voltage $U_j$, a voltage value of the first voltage $U_1$, and the voltage value of the second voltage $U_2$.

Specifically, before the reference capacitor $C_e$ and the capacitor to be measured $C_i$ are connected in series, the amount of charges on the reference capacitor $C_e$ is $C_e*U_1$, the amount of charges on the capacitor to be measured $C_i$ is $C_i*U_j$, and a sum of the amounts of charges on the reference capacitor $C_e$ and the capacitor to be measured $C_i$ is $C_e*U_1 + C_i*U_j$. After the reference capacitor $C_e$ and the capacitor to be measured $C_i$ are connected in series, total capacitance is $C_e*C_i/(C_e+C_i)$. Therefore, the sum of the amounts of charges on the reference capacitor $C_e$ and the capacitor to be measured $C_i$ after they are connected in series is $[C_e*C_i/(C_e+C_i)]*U_2$. According to the law of charge conservation, the sum of the amounts of charges on the reference capacitor $C_e$ and the capacitor to be measured $C_i$ remains unchanged before and after they are connected in series. Therefore, the following expression exists:

$$C_e*U_1 \pm C_i*U_j = [C_e*C_i/(C_e+C_i)]*U_2.$$

In a case that values of the reference capacitor $C_e$, the reference voltage $U_j$, the first voltage $U_1$, and the second voltage $U_2$ have been determined, the capacitance value of the capacitor to be measured $C_i$ may be calculated.

In practical applications, if the low voltage input terminal V_SL in the reset circuit 1 is a ground terminal, the voltage value of the reference voltage is 0 volts. The above expression may be simplified as:

$$C_i = C_e U_1/(U_2-U_1).$$

In step 502, a compensation voltage for the internal sensing line is determined according to the capacitance value of the capacity to be measured.

Specifically, after the capacitance value of the capacitor to be measured $C_i$ is sensed by the sensing circuit, the capacitance value which is actually sensed may be compared with a standardized capacitance value, and the compensation voltage for the internal sensing line $S_i$ is adjusted according to a difference between the capacitance value of the capacitor to be measured $C_i$ and the standardized capacitance value. The standardized capacitance value may be a preset capacitance value, or an average value of capacitance values corresponding to a plurality of capacitors which are measured actually. The difference between the capacitance value of the capacitor to be measured $C_i$ and the standardized capacitance value may be characterized by a ratio of the capacitance value of the capacitor to be measured $C_i$ relative to the standardized capacitance value. In practical applications, the difference therebetween may also be characterized by methods such as extracting a root of the ratio therebetween etc.

In step 503, voltage compensation is performed on the internal sensing line according to the compensation voltage corresponding to the capacitor to be measured.

Specifically, after the compensation voltage for the internal sensing line $S_i$ is determined, targeted voltage compensation may be performed on the internal sensing line $S_i$ according to the compensation voltage, thereby effectively improving the accuracy of the compensation and enhancing the display uniformity of the display panel.

Figure 6:
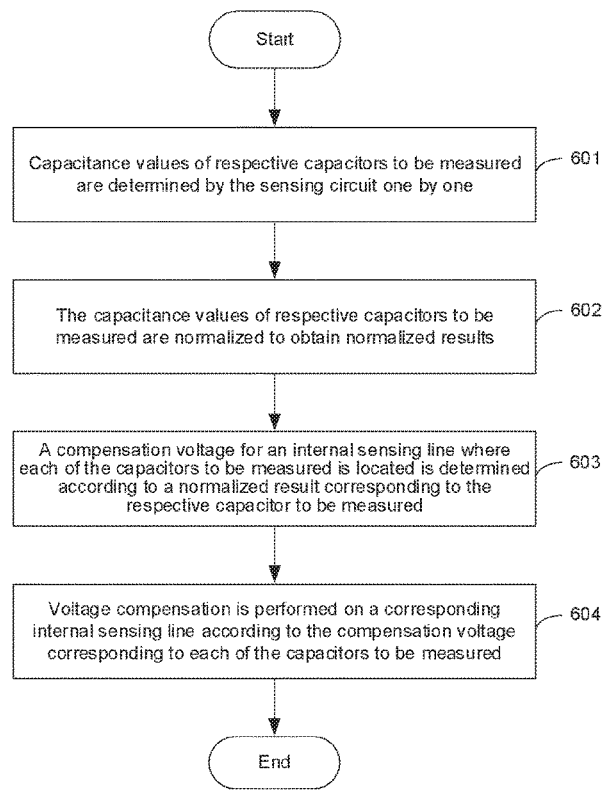
FIG. 6 is a flowchart of another voltage compensation method according to an embodiment of the present disclosure.

In practical applications, the sensing circuit may comprise at least two capacitors to be measured $C_i$ which are connected in parallel. For the sensing circuit, as shown in FIG. 6, illustrated is a flowchart of another voltage compensation method according to an embodiment of the present disclosure. The voltage compensation method comprises the following steps.

In step 601, capacitance values of various capacitors to be measured are determined by the sensing circuit one by one.

When a capacitance value of each of the capacitors to be measured is determined by the sensing circuit, the measurement may be completed in three phases, which comprise a reset phase a, a charge sharing phase b, and a voltage sensing phase c. In the reset phase a, voltages on a capacitor to be measured $C_i$ and the reference capacitor $C_e$ are reset. In the charge sharing phase b, the reference capacitor $C_e$ and the capacitor to be measured $C_i$ are connected in series to realize charge sharing between the two capacitors, so as to change the voltage on the capacitor to be measured $C_i$. In the voltage sensing phase c, the voltage value of the capacitor to be measured $C_i$ is obtained by converting an analog voltage signal on the capacitor to be measured $C_i$ into a digital voltage signal. Thereby, the capacitance value of the capacitor to be measured $C_i$ may be calculated.

Figure 7:
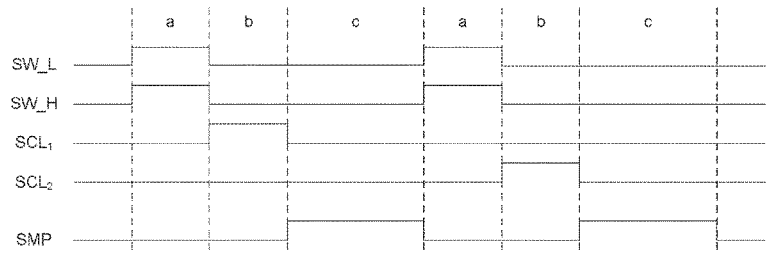
FIG. 7 is a timing diagram of switches when a sensing circuit performs sensing according to an embodiment of the present disclosure.

Specifically, after a capacitance value of one capacitor to be measured $C_i$ is determined, a voltage on a next capacitor to be measured $C_{i+1}$ is reset to the reference voltage, and the voltage on the reference capacitor $C_e$ is reset to the first voltage to reset amounts of charges on the capacitor to be measured and reference capacitor. For example, various capacitors to be measured such as $C_1$, $C_2$ etc. may be sensed one by one according to a timing diagram of switches shown in FIG. 7. In the reset phase a, the voltages on the capacitor to be measured $C_1$ and the reference capacitor $C_e$ may be reset by turning on the reset switch SW_L of the reset circuit 1 and the charging switch SW_H of the charging circuit 2. After the voltages on the capacitor to be measured $C_1$ and the reference capacitor $C_e$ are reset, the reset switch SW_L and the charging switch SW_H are turned off firstly, and then a sharing switch $SCL_1$ corresponding to the capacitor to be measured $C_1$ is turned on to connect the capacitor to be measured $C_1$ to the reference capacitor $C_e$ in series. Then, the process proceeds to the charge sharing phase b, so that a sum of amounts of charges on the capacitor to be measured $C_1$ and the reference capacitor $C_e$ maintains charge conservation before and after they are connected in series. After the charge sharing between the capacitor to be measured $C_1$ and the reference capacitor $C_e$ is completed, that is, after the voltage of the capacitor to be measured $C_1$ changes from the reference voltage to the second voltage, the sensing switch SMP of the voltage sensing circuit 4 may be turned on. Then, the process proceeds to the voltage sensing phase c to sense the voltage value of the second voltage. Then, the capacitance value of the capacitor to be measured $C_1$ is calculated. After the capacitance value of the capacitor to be measured $C_1$ is obtained, capacitance values of the respective capacitors to be measured such as $C_2$, $C_3$ etc. may be obtained in sequence according to the above method. When a next capacitor to be measured $C_1$ is measured, the process in the reset phase a may be performed so that the voltages on the capacitor to be measured $C_1$ and the reference capacitor $C_e$ are reset. Thereby, it can not only ensure that there is a sufficient amount of charges on the reference capacitor $C_e$ to prevent the charges from gradually decreasing after the charges are continuously shared, but also can eliminate an accumulated error, which makes the measurement results more accurate, thereby ensuring the accuracy of the voltage compensation.

In step 602, the capacitance values of various capacitors to be measured are normalized to obtain normalized results.

Specifically, after the capacitance values of various capacitors to be measured are determined, an average value of the capacitance values of various capacitors to be measured may be calculated as a standardized capacitance value. Then, the capacitance values of various capacitors to be measured are divided by the standardized capacitance value, so that normalized results corresponding to various capacitors to be measured are obtained. In practical applications, the normalized results corresponding to various capacitors to be measured may be stored. A pre-stored normalized result corresponding to each of the capacitors to be measured is retrieved until a compensation voltage of an internal sensing line where the capacitor to be measured is located is calculated.

In step 603, the compensation voltage for the internal sensing line where each of the capacitors to be measured is located is determined according to the normalized result corresponding to the capacitor to be measured.

Specifically, after the normalized result corresponding to each of the capacitors to be measured is obtained, a compensation voltage for an internal sensing line where the capacitor to be measured is located may be calculated according to the normalized result, a compensation coefficient, a grayscale value, and a threshold voltage corresponding to the capacitor to be measured. For example, a compensation voltage for an $i^{th}$ internal sensing line $S_i$ may be calculated by a formula $V_{comp}=K \cdot \sqrt{L}/\sqrt{C_i/C_0}+V_{th}$, wherein $V_{comp}$ is a compensation voltage, K is a compensation coefficient, L is a grayscale value, $V_{th}$ is a threshold voltage, and $C_i/C_0$ is a normalized result of a capacitor to be measured $C_i$ on an $i^{th}$ internal sensing line $S_i$.

In step 604, voltage compensation is performed on a corresponding internal sensing line according to the compensation voltage corresponding to each of the capacitors to be measured.

Specifically, after a compensation voltage of a corresponding internal sensing line where each of the capacitors to be measured is located is determined, targeted voltage compensation may be performed on the internal sensing line. In this way, the accuracy of the voltage compensation is improved, thereby realizing a more uniform display effect of the display panel.

In conclusion, in the voltage compensation method according to the embodiment of the present disclosure, the capacitance value of the capacitor to be measured is determined by the sensing circuit, the compensation voltage for the internal sensing line is determined according to the capacitance value of the capacitor to be measured, and targeted voltage compensation is performed on the internal sensing line according to the compensation voltage corresponding to the capacitor to be measured, which can eliminate the influence of the differences among the capacitors on various internal sensing lines on the voltage compensation results, thereby effectively improving the accuracy of the voltage compensation on the internal sensing lines.

Various embodiments in this description are described in a progressive manner, each of the embodiments focuses on differences from other embodiments, and the same or similar parts among the embodiments can be known with reference to each other.

The sensing circuit and the voltage compensation method according to the present disclosure have been described in detail above. Specific examples are used herein to describe the principle and implementations of the present disclosure. The description of the embodiments described above is only used to facilitate understanding the method of the present disclosure and its core ideas. At the same time, it can be understood by those skilled in the art that there may be changes in specific implementations and application scopes based on the ideas of the present disclosure. In conclusion, the contents of this description should not be construed as limitations on the present disclosure.

We claim:

1. A sensing circuit for sensing a capacitor to be measured on an internal sensing line of a display panel, the sensing circuit comprising a reset circuit, a charging circuit, an adjustment circuit, a voltage sensing circuit, and a processor;
wherein the reset circuit is connected to the capacitor to be measured and is configured to reset a voltage on the capacitor to be measured to a reference voltage;
wherein the charging circuit is connected to a reference capacitor in the adjustment circuit and is configured to charge the reference capacitor to a first voltage;
wherein the adjustment circuit comprises the reference capacitor connected to the charging circuit and is configured to be connected to the capacitor to be measured in series after the reference capacitor is charged to the first voltage, so as to adjust the voltage on the capacitor to be measured to a second voltage;
wherein the voltage sensing circuit is connected to the capacitor to be measured and is configured to sense a voltage value of the second voltage;
wherein the processor is connected to the voltage sensing circuit and is configured to calculate a capacitance value of the capacitor to be measured according to a capacitance value of the reference capacitor, the reference voltage, the first voltage, and the second voltage;
wherein the reset circuit comprises a reset switch connected to a low voltage input terminal;
wherein the reset switch is connected to the capacitor to be measured and is configured to be turned on when the capacitor to be measured is discharged, so as to reset the voltage on the capacitor to be measured through the low voltage input terminal;
wherein the charging circuit comprises a charging switch connected to a high voltage input terminal;
wherein the charging switch is connected to the reference capacitor and is configured to be turned on when the reference capacitor is charged, so as to reset the voltage on the reference capacitor through the high voltage input terminal;
wherein the adjustment circuit comprises a sharing switch connected to the reference capacitor;
wherein the sharing switch is connected to the capacitor to be measured and is configured to be turned on when the voltage on the capacitor to be measured is adjusted, so as to share charges on the reference capacitor with the capacitor to be measured;
wherein the voltage sensing circuit comprises an analog-to-digital converter and a sensing switch; and
wherein the analog-to-digital converter has one terminal connected to the capacitor to be measured through the sensing switch, and the other terminal connected to the processor, and the analog-to-digital converter is configured to convert the second voltage from an analog voltage signal into a digital voltage signal when the sensing switch is turned on.

2. The sensing circuit according to claim 1, wherein the sensing circuit comprises capacitors to be measured on at least two internal sensing lines; and
wherein there are sharing switches in one-to-one correspondence with the capacitors to be measured, and the reference capacitor is connected to the capacitors to be measured through corresponding sharing switches, respectively.

3. A sensing circuit for sensing a capacitor to be measured on an internal sensing line of a display panel, the sensing circuit comprising a reset circuit, a charging circuit, an adjustment circuit, a voltage sensing circuit, and a processor;
wherein the reset circuit is connected to the capacitor to be measured and is configured to reset a voltage on the capacitor to be measured to a reference voltage;
wherein the charging circuit is connected to a reference capacitor in the adjustment circuit and is configured to charge the reference capacitor to a first voltage;
wherein the adjustment circuit comprises the reference capacitor connected to the charging circuit and is configured to be connected to the capacitor to be measured in series after the reference capacitor is charged to the first voltage, so as to adjust the voltage on the capacitor to be measured to a second voltage;

wherein the voltage sensing circuit is connected to the capacitor to be measured and is configured to sense a voltage value of the second voltage; and wherein the processor is connected to the voltage sensing circuit and is configured to calculate a capacitance value of the capacitor to be measured according to a capacitance value of the reference capacitor, the reference voltage, the first voltage, and the second voltage;

a voltage compensation method applied to the sensing circuit comprising:

determining, by the sensing circuit, a capacitance value of a capacitor to be measured, wherein the capacitor to be measured is a capacitor on an internal sensing line to be measured of a display panel;

determining a compensation voltage for the internal sensing line according to the capacitance value of the capacitor to be measured;

performing voltage compensation on the internal sensing line according to the compensation voltage corresponding to the capacitor to be measured;

wherein the step of determining, by the sensing circuit, a capacitance value of a capacitor to be measured comprises:

resetting a voltage on the capacitor to be measured to a reference voltage, and resetting a voltage on a reference capacitor to a first voltage, so as to determine voltage values of the capacitor to be measured and the reference capacitor before they are connected in series;

adjusting the voltage on the capacitor to be measured from the reference voltage to a second voltage by connecting the capacitor to be measured and the reference capacitor in series, wherein the second voltage is a voltage of the capacitor to be measured after the capacitor to be measured and the reference capacitor are connected in series;

sensing a voltage value of the second voltage; and calculating the capacitance value of the capacitor to be measured according to the voltage values of the capacitor to be measured and the reference capacitor before and after they are connected in series and a capacitance value of the reference capacitor.

4. The voltage compensation method according to claim 3, wherein the step of calculating the capacitance value of the capacitor to be measured according to the voltage values of the capacitor to be measured and the reference capacitor before and after they are connected in series and a capacitance value of the reference capacitor comprises:

calculating the capacitance value of the capacitor to be measured according to the capacitance value of the reference capacitor, a voltage value of the reference voltage, and voltage values of the first voltage and the second voltage.

5. A sensing circuit for sensing a capacitor to be measured on an internal sensing line of a display panel, the sensing circuit comprising a reset circuit, a charging circuit, an adjustment circuit, a voltage sensing circuit, and a processor, wherein the reset circuit is connected to the capacitor to be measured and is configured to reset a voltage on the capacitor to be measured to a reference voltage;

wherein the charging circuit is connected to a reference capacitor in the adjustment circuit and is configured to charge the reference capacitor to a first voltage;

wherein the adjustment circuit comprises the reference capacitor connected to the charging circuit and is configured to be connected to the capacitor to be measured in series after the reference capacitor is charged to the first voltage, so as to adjust the voltage on the capacitor to be measured to a second voltage;

wherein the voltage sensing circuit is connected to the capacitor to be measured and is configured to sense a voltage value of the second voltage;

wherein the processor is connected to the voltage sensing circuit and is configured to calculate a capacitance value of the capacitor to be measured according to a capacitance value of the reference capacitor, the reference voltage, the first voltage, and the second voltage;

a voltage compensation method applied to the sensing circuit comprising:

determining, by the sensing circuit, a capacitance value of a capacitor to be measured, wherein the capacitor to be measured is a capacitor on an internal sensing line to be measured of a display panel;

determining a compensation voltage for the internal sensing line according to the capacitance value of the capacitor to be measured;

performing voltage compensation on the internal sensing line according to the compensation voltage corresponding to the capacitor to be measured;

wherein the sensing circuit comprises at least two capacitors to be measured which are connected in parallel;

wherein the step of determining a compensation voltage for the internal sensing line according to the capacitance value of the capacitor to be measured comprises:

normalizing capacitance values of respective capacitors to be measured to obtain normalized results; and determining a compensation voltage for an internal sensing line where each of the capacitors to be measured is located according to a normalized result corresponding to the respective capacitor to be measured.

6. The voltage compensation method according to claim 5, wherein the step of normalizing capacitance values of respective capacitors to be measured comprises:

calculating an average value of the capacitance values of respective capacitors to be measured as a standardized capacitance value; and dividing a capacitance value of each of the capacitors to be measured by the standardized capacitance value to obtain a normalized result corresponding to the respective capacitor to be measured.

7. The voltage compensation method according to claim 5, wherein the step of determining a compensation voltage for an internal sensing line where each of the capacitors to be measured is located according to a normalized result corresponding to the respective capacitor to be measured comprises:

calculating the compensation voltage for the internal sensing line where each of the capacitors to be measured is located according to the normalized result, a compensation coefficient, a grayscale value, and a threshold voltage corresponding to the respective capacitor to be measured.

8. The voltage compensation method according to claim 5, wherein when the sensing circuit comprises capacitors to be measured on at least two internal sensing lines, the step of determining, by the sensing circuit, the capacitance value of the capacitor to be measured comprises:

after a capacitance value of one capacitor to be measured is determined, resetting a voltage on a next capacitor to be measured to the reference voltage, and resetting the voltage on the reference capacitor to the first voltage, so as to reset amounts of charges on the capacitor to be measured and the reference capacitor.

* * * * *